(12) United States Patent
Hope et al.

(10) Patent No.: US 10,898,796 B2
(45) Date of Patent: *Jan. 26, 2021

(54) ELECTRONIC CONTROLLER WITH FINGER SENSING AND AN ADJUSTABLE HAND RETAINER

(71) Applicant: Valve Corporation, Bellevue, WA (US)

(72) Inventors: Eric James Hope, Bellevue, WA (US); Scott Nietfeld, Bellevue, WA (US); Carl Conlee, Seattle, WA (US); Scott Richard Britt, Kirkland, WA (US); Jeffrey Walter Mucha, Sammamish, WA (US); Jeffrey George Leinbaugh, Kirkland, WA (US); Jeremy Slocum, Sammamish, WA (US)

(73) Assignee: Valve Corporation, Bellevue, WA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/377,058

(22) Filed: Apr. 5, 2019

(65) Prior Publication Data

US 2019/0232160 A1 Aug. 1, 2019

Related U.S. Application Data

(63) Continuation of application No. 15/834,372, filed on Dec. 7, 2017, now Pat. No. 10,307,669, which is a
(Continued)

(51) Int. Cl.
*A63F 13/24* (2014.01)
*A63F 13/218* (2014.01)
(Continued)

(52) U.S. Cl.
CPC ............ *A63F 13/24* (2014.09); *A63F 13/213* (2014.09); *A63F 13/218* (2014.09); *A63F 13/428* (2014.09); *G06F 3/014* (2013.01)

(58) Field of Classification Search
CPC ...... A63F 13/24; A63F 13/211; A63F 13/428; A63F 2300/8082; A63F 2009/2407; G06F 3/014
See application file for complete search history.

(56) References Cited

U.S. PATENT DOCUMENTS

| 4,489,302 A | 12/1984 | Eventoff |
| 4,845,457 A | 7/1989 | Nakanishi |
(Continued)

FOREIGN PATENT DOCUMENTS

JP WO2018179180 A1 10/2018

OTHER PUBLICATIONS

The PCT Search Report and Written Opinion dated Oct. 8, 2019 for PCT Application No. PCT/US19/32982, 11 pages.
(Continued)

*Primary Examiner* — Jasson H Yoo
(74) *Attorney, Agent, or Firm* — Lee & Hayes, P.C.

(57) ABSTRACT

A controller for an electronic system includes a tracking member fixed to a controller body. The controller body has a head that adjoins a handle at a neck region, and that includes at least one thumb-operated control. The controller includes a hand retainer that in a closed position is configured to physically bias the user's palm against an outer surface of the handle. The hand retainer includes a resilient member that biases the hand retainer towards an open position. The resilient member is attached to an anchor that is attached to the head by an adjustment mechanism that permits the resilient member to be moved towards or away from the user's purlicue. The tracking member includes transducers that are coupled to the electronic system by electromagnetic radiation. Proximity sensors, spatially distributed on the handle, are responsive to a proximity of the user's fingers to the outer surface of the handle.

20 Claims, 10 Drawing Sheets

Related U.S. Application Data continuation-in-part of application No. 15/679,521, filed on Aug. 17, 2017, now Pat. No. 10,391,400, which is a continuation-in-part of application No. 29/580,635, filed on Oct. 11, 2016, now Pat. No. Des. 806,173.

(60) Provisional application No. 62/520,958, filed on Jun. 16, 2017.

(51) Int. Cl.
   *A63F 13/213*   (2014.01)
   *A63F 13/428*   (2014.01)
   *G06F 3/01*   (2006.01)

(56) References Cited

U.S. PATENT DOCUMENTS

| | | | |
|---|---|---|---|
| 5,184,120 | A | 2/1993 | Schultz |
| 5,302,936 | A | 4/1994 | Yaniger |
| 5,912,612 | A | 6/1999 | DeVolpi |
| 6,285,276 | B1 | 9/2001 | Nedele et al. |
| 6,388,556 | B1 | 5/2002 | Imai et al. |
| 6,829,942 | B2 | 12/2004 | Yanai et al. |
| 7,112,755 | B2 | 9/2006 | Kitano et al. |
| 7,932,892 | B2 | 4/2011 | Chen et al. |
| 8,062,126 | B2 | 11/2011 | Marks et al. |
| 8,274,358 | B2 | 9/2012 | Ando et al. |
| 8,586,882 | B2 | 11/2013 | Tanaka et al. |
| 8,636,199 | B1 | 1/2014 | Slayden et al. |
| 8,816,964 | B2 | 8/2014 | Edwards |
| 9,508,504 | B2 | 11/2016 | Suzuki et al. |
| 9,690,408 | B1 | 6/2017 | Krah |
| 9,696,223 | B2 | 7/2017 | Lisseman et al. |
| 10,307,669 | B2 * | 6/2019 | Hope ............... A63F 13/24 |
| 10,353,506 | B2 | 7/2019 | Vosgueritchian et al. |
| 10,386,224 | B2 | 8/2019 | Shim et al. |
| 10,444,094 | B1 | 10/2019 | Ocampo |
| 2001/0035856 | A1 | 11/2001 | Myers |
| 2002/0010020 | A1 | 1/2002 | Johnson |
| 2002/0175894 | A1 | 11/2002 | Grillo |
| 2003/0043014 | A1 | 3/2003 | Nakazawa et al. |
| 2003/0090465 | A1 | 5/2003 | Dellinger |
| 2007/0119698 | A1 | 5/2007 | Day |
| 2007/0279380 | A1 | 12/2007 | Murillo |
| 2008/0136778 | A1 * | 6/2008 | Hursh ............... G06F 3/014 |
| | | | 345/164 |
| 2010/0194682 | A1 | 8/2010 | Orr et al. |
| 2011/0221564 | A1 | 9/2011 | Deppiesse et al. |
| 2014/0015633 | A1 | 1/2014 | Nakae et al. |
| 2014/0274397 | A1 | 9/2014 | Sebastian |
| 2015/0359457 | A1 | 12/2015 | Blumenthal et al. |
| 2016/0283008 | A1 | 9/2016 | Perlin et al. |
| 2016/0364002 | A1 | 12/2016 | Gates et al. |
| 2017/0177102 | A1 | 6/2017 | Long |
| 2017/0192506 | A1 | 7/2017 | Andersen et al. |
| 2018/0188816 | A1 * | 7/2018 | Liu ............... G06F 3/011 |
| 2018/0272232 | A1 | 9/2018 | Campbell et al. |
| 2019/0009172 | A1 | 1/2019 | Sawai et al. |
| 2019/0102927 | A1 | 4/2019 | Yokokawa |
| 2019/0308110 | A1 | 10/2019 | Muramatsu et al. |
| 2019/0325651 | A1 | 10/2019 | Bradner et al. |
| 2019/0344173 | A1 | 11/2019 | Mucha et al. |

OTHER PUBLICATIONS

Non Final Office Action dated Mar. 18, 2020 for U.S. Appl. No. 15/984,231 "Force Sensing Resistor (FSR) With Polymide Substrate, Systems, and Methods Thereof", Campbell, 12 pages.

Final Office Action dated Feb. 4, 2020 for U.S. Appl. No. 16/010,385 "Electronic Controller with Finger Motion Sensing" Nietfeld, 12 pages.

Non Final Office Action dated Jun. 12, 2020 for U.S. Appl. No. 16/392,497, "Electronic Controller With Finger Sensing and an Adjustable Hand Retainer", Petersen, 13 pages.

Non Final Office Action dated Jun. 22, 2020 for U.S. Appl. No. 16/195,718, "Virtual Reality Hand Gesture Generation", Nietfeld, 26 pages.

Non Final Office Action dated Jul. 20, 2020 for U.S. Appl. No. 16/389,499, "Holding and Releasing Virtual Objects", Bradner, 22 pages.

The PCT Search Report and Written Opinion dated Jul. 1, 2020 for PCT Application No. PCT/US2020/028517, 13 pages.

* cited by examiner

ELECTRONIC CONTROLLER WITH FINGER SENSING AND AN ADJUSTABLE HAND RETAINER

CROSS-REFERENCE TO RELATED APPLICATION

This application is a continuation of co-pending, commonly owned U.S. patent application Ser. No. 15/834,372 filed 7 Dec. 2017, entitled "ELECTRONIC CONTROLLER WITH FINGER SENSING AND AN ADJUSTABLE HAND RETAINER," which itself claims priority under 35 U.S.C. § 120 as a continuation-in-part to pending U.S. patent application Ser. No. 15/679,521 filed 17 Aug. 2017, entitled "ELECTRONIC CONTROLLER WITH HAND RETAINER AND FINGER MOTION SENSING," which itself claims priority as a continuation-in-part to U.S. patent application Ser. No. 29/580,635 filed 11 Oct. 2016, now Pat. No. D806,173, and claims priority to U.S. Provisional Patent Application 62/520,958 filed 16 Jun. 2017. Application Ser. Nos. 15/834,372, 15/679,521, 29/580,635, and 62/520,958 are hereby incorporated by reference in their entirety.

BACKGROUND OF THE DISCLOSURE

The video game industry has become large and important, and has spawned many innovations in both software and related hardware. Various hand-held video game controllers have been designed, manufactured, and sold, for a variety of game applications. Some of those innovations have applicability outside of the video game industry, such as for controllers of industrial machines, defense systems, robotics, etc. Virtual reality (VR) systems are an application of great contemporary interest and rapid technical advancement, both within and outside of the video game industry. The controllers for VR systems have to perform several different functions, and meet strict (and sometimes competing) design constraints, often while optimizing certain desired characteristics like ease of use, etc. Hence, there is a need in the art for an improved controller design that may improve VR systems and/or better facilitate user operation.

DETAILED DESCRIPTION OF EXAMPLE EMBODIMENTS

Figure 1:
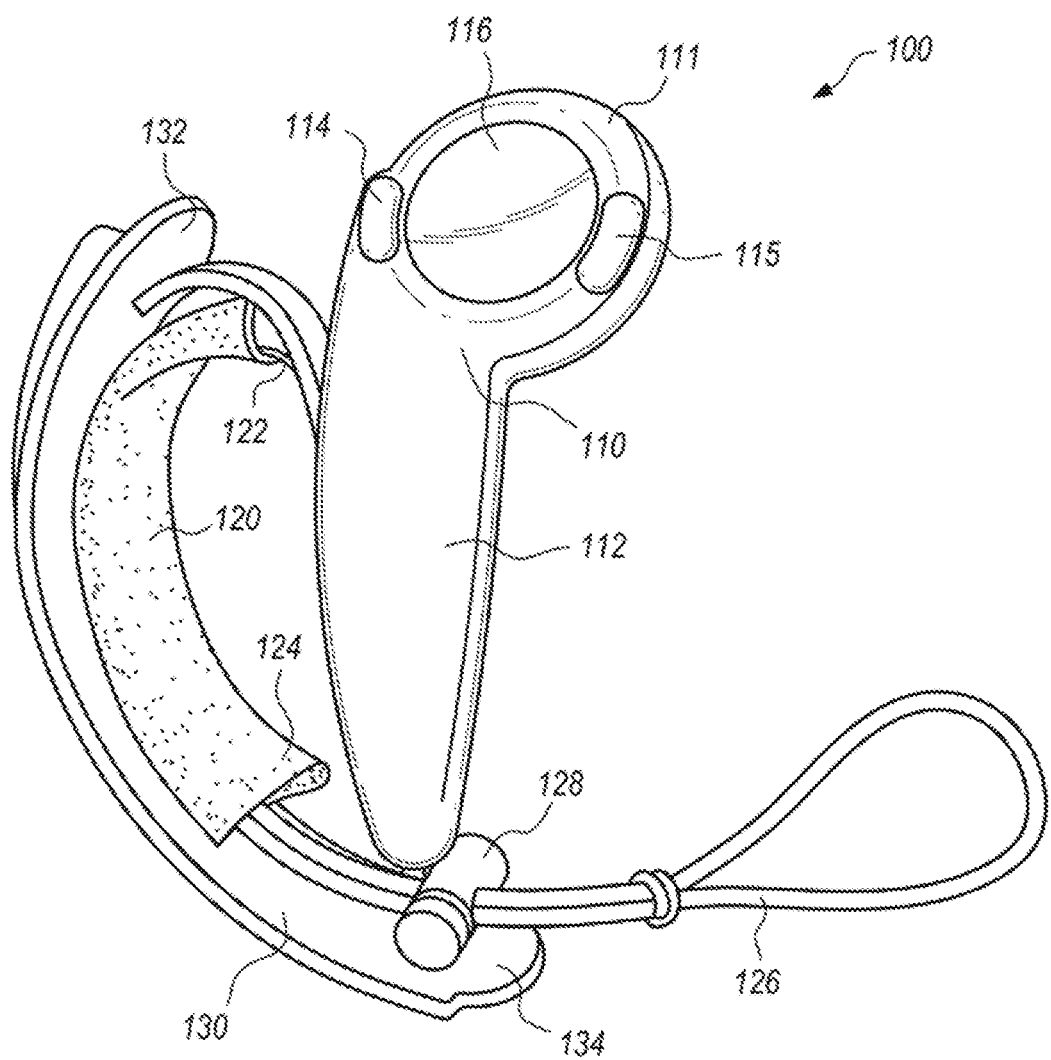
FIG. 1 depicts a controller according to an example embodiment of the present invention, with a hand retainer in an open position.

FIGS. 1-4 depict a controller 100 for an electronic system according to an example embodiment of the present invention. The controller 100 may be utilized by an electronic system such as a VR video gaming system, a robot, weapon, or medical device. The controller 100 may include a controller body 110 having a handle 112, and a hand retainer 120 to retain the controller 100 in the hand of a user (e.g. the user's left hand). The handle 112 comprises a tubular housing that may optionally be substantially cylindrical. In this context, a substantially cylindrical shape need not have constant diameter, or a perfectly circular cross-section.

In the embodiment of FIGS. 1-4, the controller body 110 may include a head (between the handle 112 and a distal end 111), which may optionally include one or more thumb-operated controls 114, 115, 116. For example, a tilting button, or any other button, knob, wheel, joystick, or trackball may be considered as a thumb-operated control if it may be conveniently manipulated by a user's thumb during normal operation while the controller 100 is held in the hand of the user.

The controller 100 preferably includes a tracking member 130 that is fixed to the controller body 110, and optionally includes two noses 132, 134, each protruding from a corresponding one of two opposing distal ends of the tracking member 130. In the embodiment of FIGS. 1-4, the tracking member 130 is preferably but not necessarily a tracking arc having an arcuate shape. The tracking member 130 includes a plurality of tracking transducers disposed therein, preferably with at least one tracking transducer disposed in each protruding nose 132, 134. Additional tracking transducers may be disposed also in the controller body 110, with preferably at least one distal tracking transducer disposed adjacent the distal end 111.

The foregoing tracking transducers may be tracking sensors that are responsive to electromagnetic radiation (e.g. infrared light) emitted by the electronic system, or they may alternatively be tracking beacons that emit electromagnetic radiation (e.g. infrared light) that is received by the electronic system. For example, the electronic system may be a VR gaming system that widely broadcasts, i.e. paints, pulsed infrared light towards the controller 100, with the plurality of tracking transducers of the tracking member 130 being infrared light sensors that may receive or be shadowed from the broadcast pulsed infrared light. The tracking transducers in each nose 132, 134 (e.g. 3 sensors in each nose) preferably overhang the user's hand on each distal end of the tracking member 130, and so are better exposed (around the user's hand) to receive electromagnetic radiation emitted by the electronic system or to transmit the electromagnetic radiation to the electronic system, at more angles without an unacceptable amount of shadowing.

Preferably, the tracking member 130 and the controller body 110 are made of a substantially rigid material such as hard plastic, and are firmly fixed together so that they do not appreciably translate or rotate relative to each other. In this way, the tracking of the translation and rotation of the constellation of tracking transducers in space, is preferably not complicated by motion of the tracking transducers relative to each other. For example, as shown in FIGS. 1-4, the tracking member 130 may be fixed to the controller body 110 by being joined to the controller body 110 at two locations. The hand retainer 120 may be attached to the controller 100 (either the controller body 110 or the tracking member 130) adjacent those two locations, to bias the user's palm against the outside surface of the handle 112 between the two locations.

In certain embodiments, the tracking member 130 and the controller body 110 may comprise an integral monolithic component having material continuity, rather than being assembled together. For example, the tracking member 130 and the controller body 110 may be molded together by a single injection-molding process step, resulting in one integral hard plastic component that comprises both the tracking member 130 and the controller body 110. Alternatively, the tracking member 130 and the controller body 110 may be initially fabricated separately, and then later assembled together. Either way, the tracking member 130 may be considered as fixed to the controller body 110.

The hand retainer 120 is shown in the open position in FIG. 1. The hand retainer 120 may optionally be biased in the open position by a curved resilient member 122, to facilitate the insertion of the user's left hand between the hand retainer 120 and the controller body 110 when the user is grasping for the controller with vision blocked by VR goggles. For example, the curved resilient member 122 may optionally be a flexible metal strip that elastically bends, or may comprise an alternative plastic material such as nylon that may bend substantially elastically. The curved resilient member 122 may optionally be partially or completely internal to or covered by a cushion or fabric material 124 (e.g. a neoprene sheath), for the user's comfort. Alternatively, the cushion or fabric material 124 may be disposed on (e.g. adhered to) only the side of the curved resilient member 122 that faces the user's hand.

The hand retainer 120 optionally may be adjustable in length, for example by including a draw cord 126 that is cinched by a spring-biased chock 128. The draw cord 126 may optionally have an excess length that may be used as a lanyard. The sheath 124 optionally may be attached to the draw cord. In certain embodiments, the curved resilient member 122 may be preloaded by the tension of the cinched draw cord 126. In such embodiments, the tension that the curved resilient member 122 imparts to the hand retainer 120 (to bias it in the open position) causes the hand retainer to automatically open when the draw cord 126 is un-cinched. This disclosure also contemplates alternative conventional ways to adjust the length of a hand retainer 120, such as a cleat, an elastic band (that temporarily stretches when the hand is inserted, so that it applies elastic tension to press against the back of the hand), a hook & loop strap attachment that allows length adjustment, etc.

Figure 2:
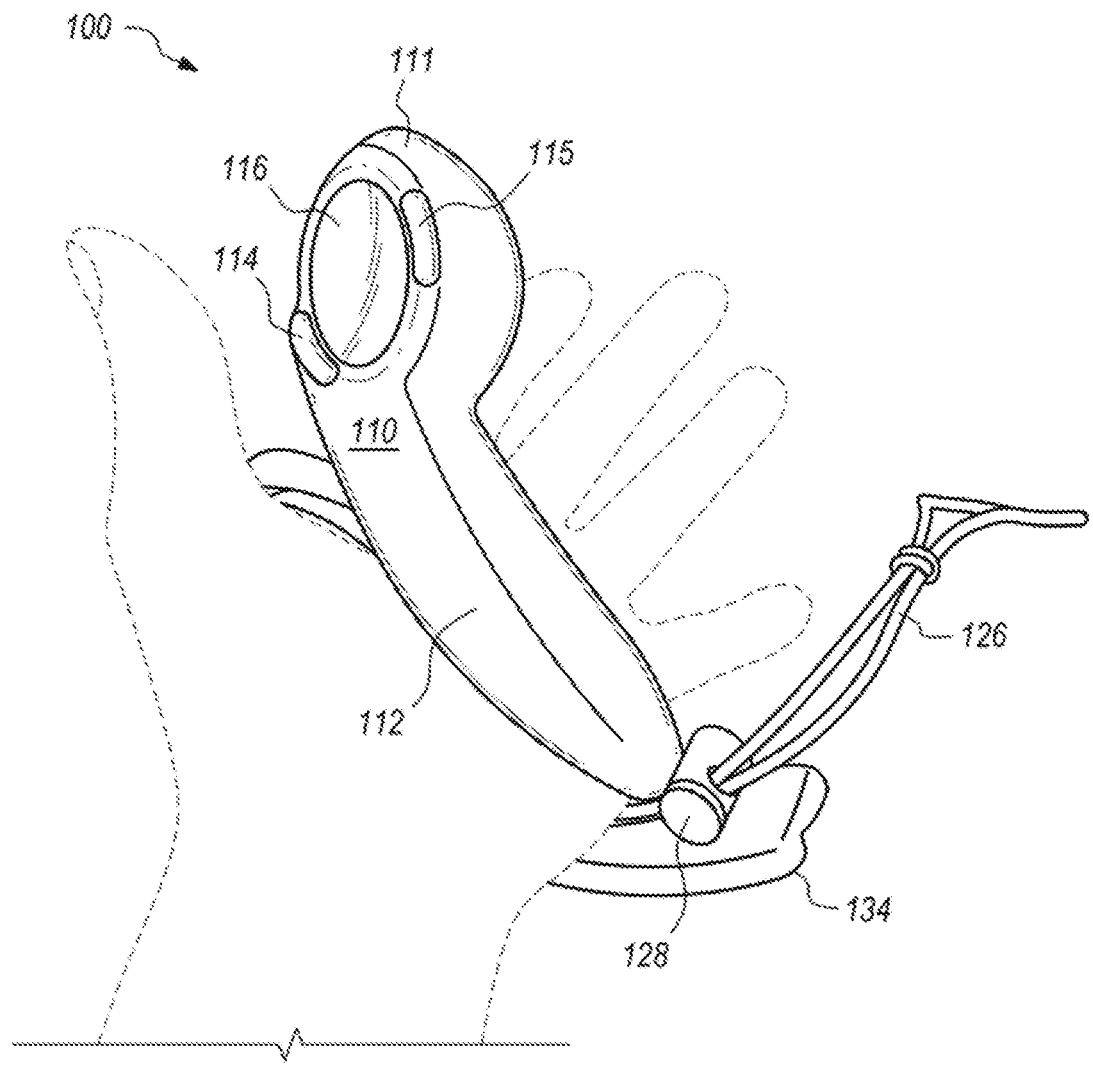
FIG. 2 depicts the controller of FIG. 1 in a user's open hand, palm up.
Figure 3:
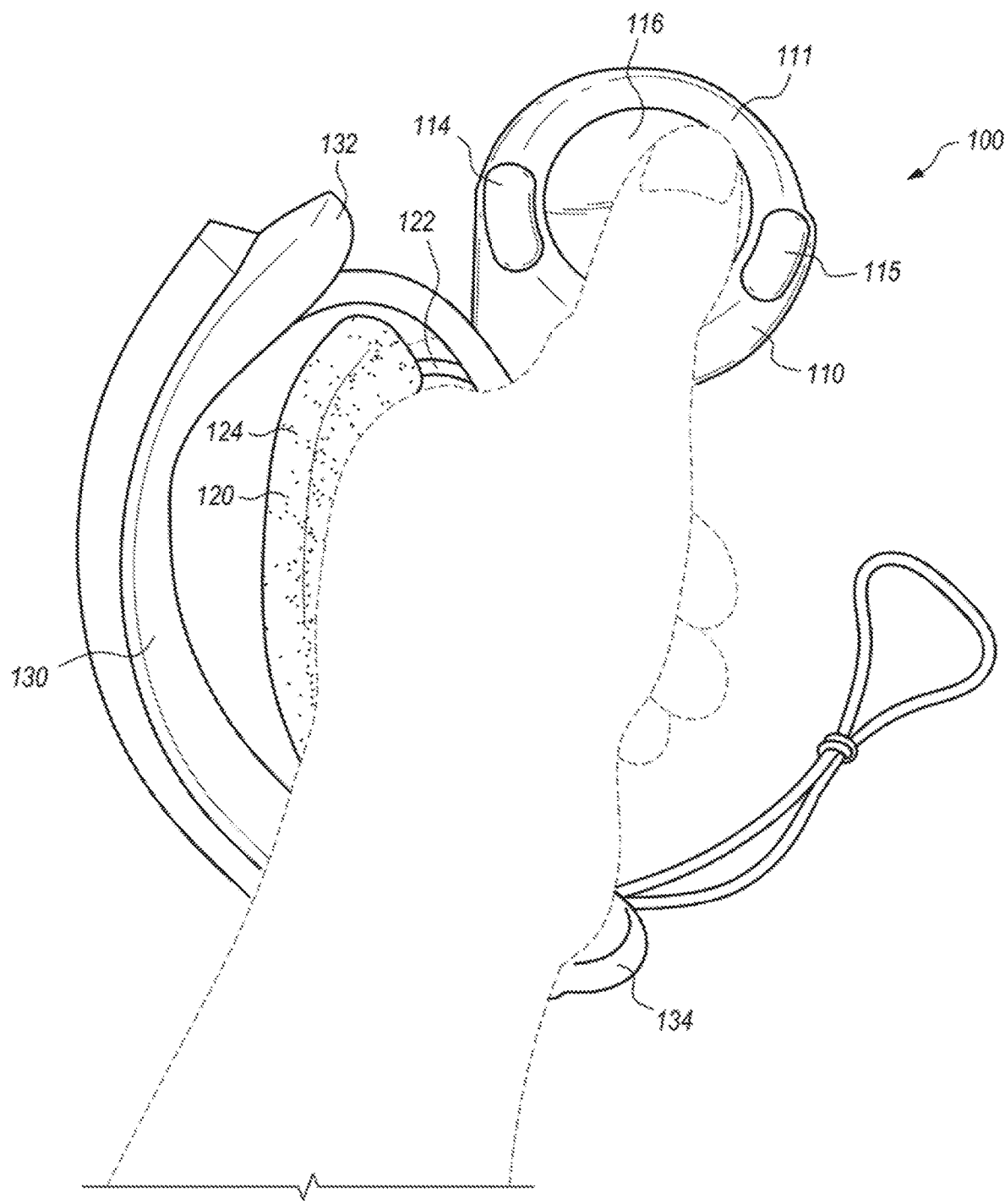
FIG. 3 depicts the controller of FIG. 1 in a user's closed hand.
Figure 4:
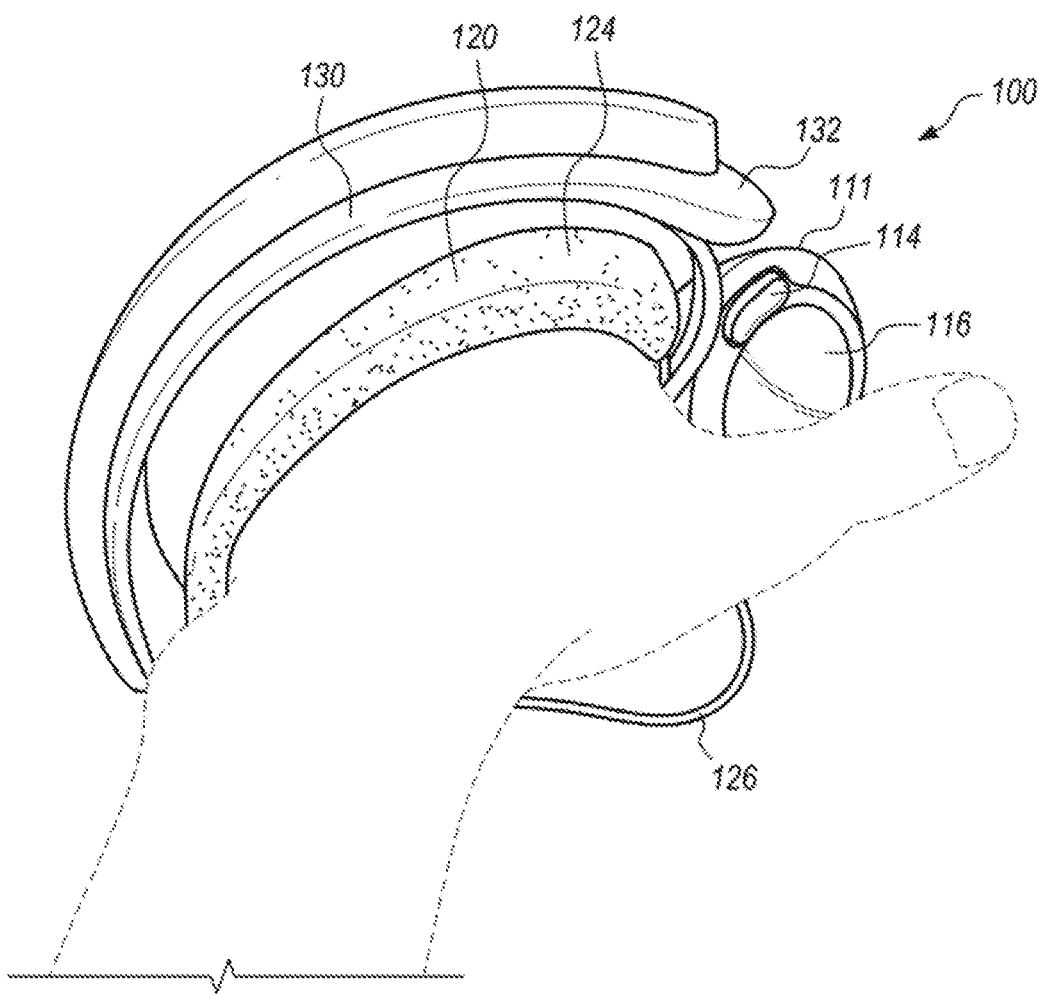
FIG. 4 depicts the controller of FIG. 1 in a user's hand, palm down.

The hand retainer 120 may be disposed between the handle 112 and the tracking member 130, and be configured to contact the back of the user's hand. FIG. 2 shows the controller 100 during operation with the user's left hand inserted therein but not grasping the controller body 110. In FIG. 2, the hand retainer 120 is closed and tightened over the hand, to physically bias the user's palm against the outside surface of the handle 112. In that way, the hand retainer 120, when closed, may retain the controller 100 to the hand even when the hand is not grasping the controller body 110. FIGS. 3 and 4 depict the controller 100 during operation when the hand retainer 120 is closed, and the hand is grasping the controller body 110 and the thumb is operating one or more of the thumb-operated controls (e.g. track pad 116).

The handle 112 of the controller body 110 preferably includes an array of proximity sensors that are spatially distributed partially or completely around its outer surface. The proximity sensors of the array are not necessarily of equal size and do not necessarily have equal spacing between them, although the array may comprise a grid. The array of proximity sensors is preferably responsive to the proximity of the user's fingers to the outside surface of the handle 112. For example, the array of proximity sensors may be a plurality of capacitive sensors embedded under the outer surface of the handle 112, with that outer surface comprising an electrically insulative material. The capacitance between such an array of capacitive sensors and a portion of the user's hand is inversely related to the distance there between. The capacitance may be sensed by connecting an RC oscillator circuit to an element of the capacitance sensor array, and noting that the time constant of the circuit (and therefore the period and frequency of oscillation) will vary with the capacitance. In this way, the circuit may detect a release of a user's fingers from the outer surface of the handle 112.

When the hand retainer 120 (e.g. a hand-retention strap) is closed tightly, it may serve not only to prevent the controller 100 from falling out of hand, but also to keep fingers from excessively translating relative to the proximity sensor array of the handle 112, to more reliably sense finger motion. The electronic system may include an algorithm embodying anatomically-possible motions of fingers, to better use the sensing from the proximity sensor array to render the opening of a controlled character's hand, finger pointing, or other motions of fingers relative to controller or relative to each other. In this way, the user's movement of the controller 100 and/or fingers may help control a VR gaming system, defense system, medical system, industrial robot or machine, or another device. In VR system applications (e.g. for gaming, training, etc.), the system may render a throwing motion based on the movement of the tracking transducers, and may render the release of a thrown object based on the sensed release of the user's fingers from the outer surface of the handle of the controller.

Hence, the function of the hand retainer 120 (to allow the user to "let go" of the controller 100 without the controller 100 actually separating from the hand or being thrown or dropped to the floor) may enable additional functionality of the controlled electronic system. For example, if the release and restoration of the user's grasp of the handle 112 of the controller body 110 is sensed, then such release or grasping may be incorporated into the game to display (e.g. in VR) throwing or grasping objects. The hand retainer 120 may allow such a function to be accomplished repeatedly and safely. For example, the location of the hand retainer 120 in the embodiment of FIGS. 1-4 may help the tracking member 130 to protect back of user's hand from impacts in real world, for example when the user moves in response to a prompt sensed in the VR environment (e.g. while practically blinded by VR goggles).

In certain embodiments, the controller 100 may include a rechargeable battery disposed within the controller body 110, and the hand retainer 120 (e.g. hand retention strap) may include an electrically-conductive charging wire that is electrically coupled to the rechargeable battery. The controller 100 preferably also includes a radio frequency (RF) transmitter for communication with the rest of the electronic system. Such RF transmitter may be powered by the rechargeable battery and may be responsive to the thumb-operated controls 114, 115, 116, the proximity sensors in the handle 112 of the controller body 110, and/or tracking sensors in the tracking member 130.

Figure 5:
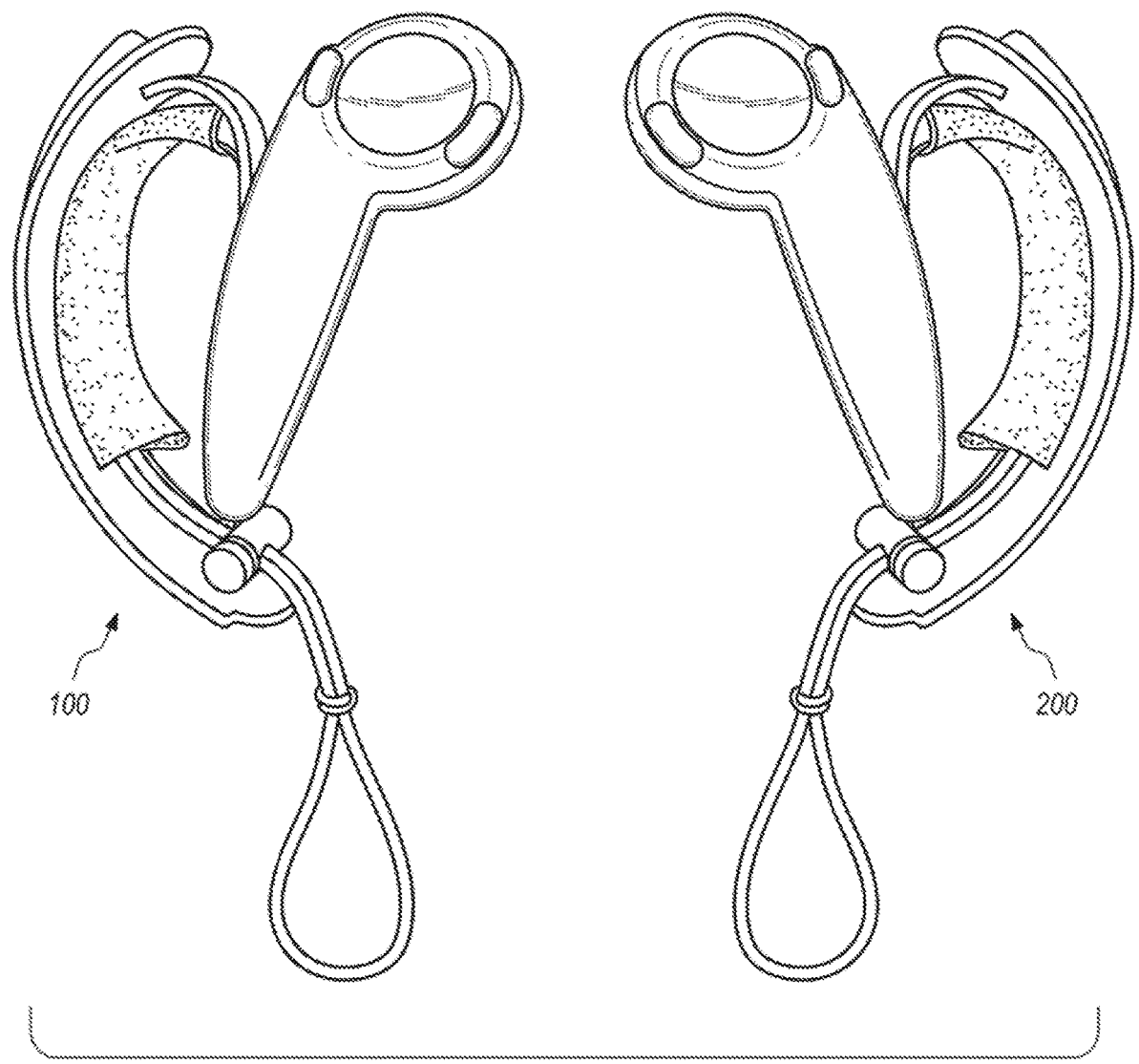
FIG. 5 depicts a pair of controllers according to an example embodiment of the present invention, with hand retainers in an open position.

As shown in FIG. 5, in certain embodiments the controller 100 may be the left controller in a pair of controllers that includes a similar right controller 200. In certain embodiments, the controllers 100 and 200 may (together) track the motion and grip of both of a user's hands, simultaneously, for example to enhance a VR experience.

Figure 6A:
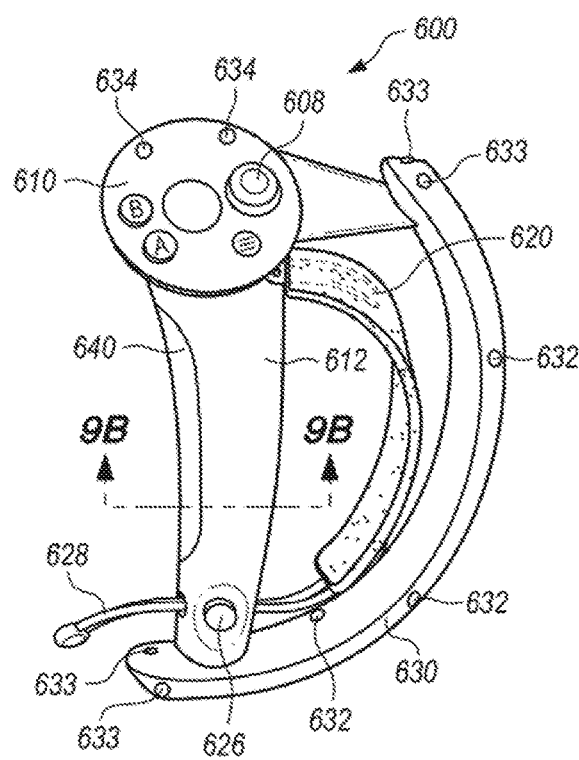
FIG. 6A depicts a front view of right-hand controller according to another example embodiment of the present invention.
Figure 6B:
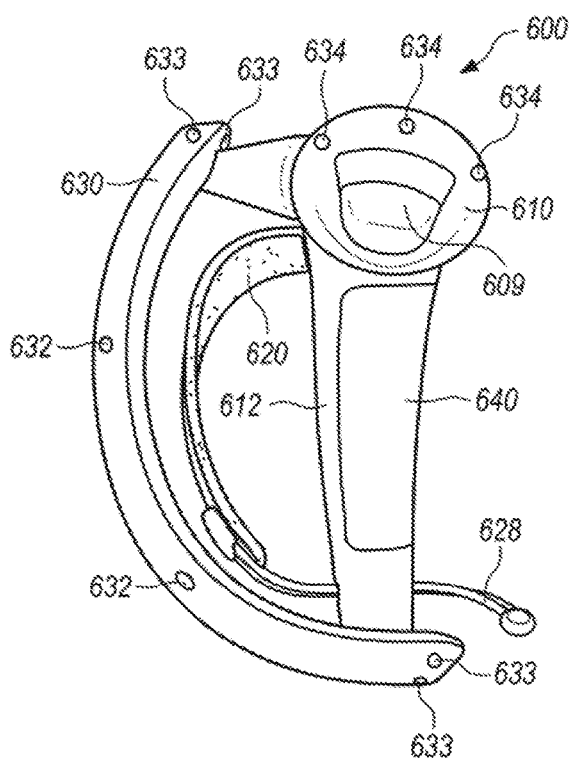
FIG. 6B depicts a back view of the right-hand controller of FIG. 6A.

FIG. 6A depicts a front view of right-hand controller 600 according to another example embodiment of the present invention. FIG. 6B depicts a back view of the right-hand controller 600. The controller 600 has a controller body comprising a head 610 and a handle 612. In the embodiment of FIGS. 6A-6B, the head 610 includes at least one thumb-operated control A, B, 608, and may also include a control configured to be operated by the index finger (e.g. trigger 609). The handle 612 comprises a tubular housing that is partially wrapped by an outer shell 640.

In the embodiment of FIGS. 6A-6B, a tracking member 630 is fixed to the controller body at the head 610 and at an end of the handle 612. A hand retainer 620 is configured to physically bias the user's palm against the outer shell 640 between the head 610 and the end of the handle 612. The hand retainer 620 is preferably disposed between the handle 612 and the tracking member 630, and may comprise a hand retention strap that is adjustable in length and configured to contact the back of the user's hand. In the embodiment of FIGS. 6A-6B, the hand retainer 620 optionally includes a draw cord 628, and optionally can be adjusted in length by a cord lock 626 (adjacent a distal end of the handle 612) that selectively prevents sliding motion by the draw cord 628 at the location of the cord lock 626.

In the embodiment of FIGS. 6A-6B, tracking transducers 632, 633 are disposed on the tracking member 630, with tracking transducers 633 being disposed on protruding noses at opposing distal ends of the tracking member 630. Additional tracking transducers 634 are optionally disposed on a distal region of the head 610. The tracking transducers 632, 633, and 634 may be tracking sensors that are responsive to electromagnetic radiation (e.g. infrared light) emitted by the electronic system (e.g. virtual reality gaming system), or may be tracking beacons that emit electromagnetic radiation (e.g. infrared light) that is received by the electronic system.

For example, the electronic system may be a VR gaming system that widely broadcasts, i.e. paints, pulsed infrared light towards the controller 600, with the tracking transducers 632, 633, and 634 being infrared light sensors that may receive the broadcast pulsed infrared light. The response of such tracking sensors may be communicated back to the electronic system, and the system may interpret such response to effectively track the location and orientation of the controller 600.

Figure 7A:
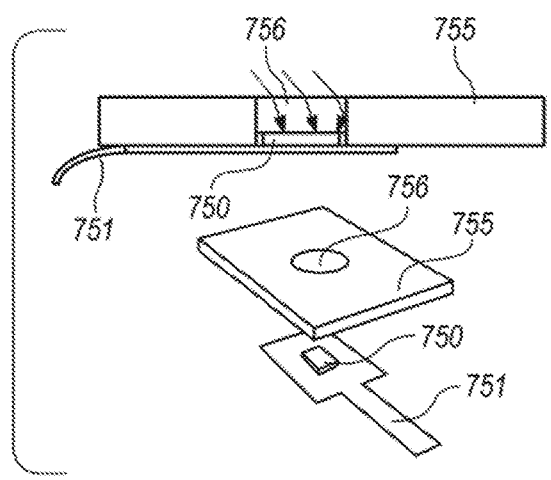
FIG. 7A depicts a window for an infrared light sensor, according to an embodiment of the present invention.
Figure 7B:
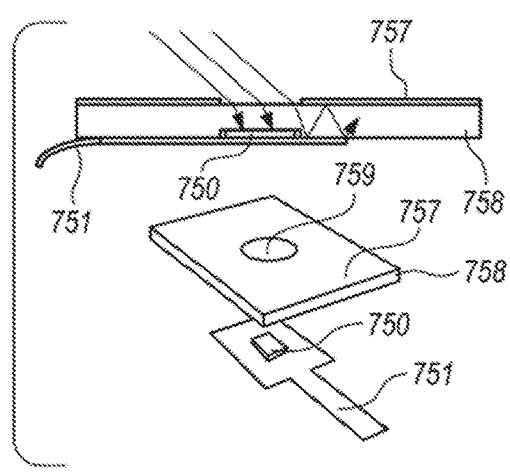
FIG. 7B depicts a window for an infrared light sensor, according to another embodiment of the present invention.

One or more of the tracking transducers 632, 633, 634 optionally may be structured as shown in the embodiment of FIG. 7A, or alternatively shown in the embodiment of FIG. 7B, or alternatively in a conventional way that is not shown. The lower portion of FIG. 7A depicts an exploded perspective view of an infrared light sensor 750 that is electrically connected to a flex circuit 751, shown beneath a rectangular portion of an overlying windowed housing wall 755 that comprises an infrared-opaque plastic. The windowed housing wall 755 includes a window 756. The window 756 preferably comprises an infrared-transmissive polycarbonate plastic, and may include an underside recession to accommodate the thickness of the infrared light sensor 750.

According to the embodiment of FIG. 7A, the windowed housing wall (e.g. the outer structure of the tracking member 630, or the head 610 of FIG. 6A) may be fabricated from a so-called "double shot" injection molding process, so that the majority of the housing wall is fabricated from infrared-opaque plastic, but with infrared-transmissive plastic being disposed in the window 756 above the infrared light sensor 750.

The upper portion of FIG. 7A depicts a cross-sectional view of the infrared light sensor 750, flex circuit 751, and the windowed housing wall 755 as assembled. Infrared light, shown in FIG. 7A as three downward arrows incident upon the window 756 from above, passes through the window 756 to be received by the underlying infrared light sensor 750. Since the housing wall 755 comprises infrared-opaque plastic, the infrared light that strikes it will not pass through, and a portion may be reflected back into the window to be received by the infrared light sensor 750. In this way, the window 756 permits infrared light to affect the infrared light sensor 750, despite the majority of the housing wall 755 comprising infrared-opaque plastic, so that the infrared light sensor 750 receives infrared light only from a preferred angular range.

Alternatively, one or more of the tracking transducers 632, 633, 634 optionally may be structured as shown in the embodiment of FIG. 7B. The lower portion of FIG. 7B depicts an exploded perspective view of the infrared light sensor 750 as electrically connected to the flex circuit 751, shown beneath a rectangular portion of an overlying housing wall 758 that comprises an IR-transmissive plastic. The housing wall 758 is coated with an infrared-opaque film 757 that is patterned to include a window 759 (where the infrared-opaque film 757 is absent).

The upper portion of FIG. 7B depicts a cross-sectional view of the infrared light sensor 750, flex circuit 751, the housing wall 758, and the IR-opaque film 757, as assembled. Infrared light, shown in FIG. 7B as three downward arrows incident upon the housing wall 758 from above, passes through the window 759 in the infrared-opaque film 757 to pass through the housing wall 758 there to be received by the underlying infrared light sensor 750. Since the housing wall 758 comprises infrared-transmissive plastic, the infrared light that strikes it may pass into it and be lost, and perhaps unintentionally and undesirably even reach a nearby sensor via internal reflections. In this way, the window 759 in the infrared-opaque film 757 permits infrared light to primarily affect the infrared light sensor 750.

Figure 8:
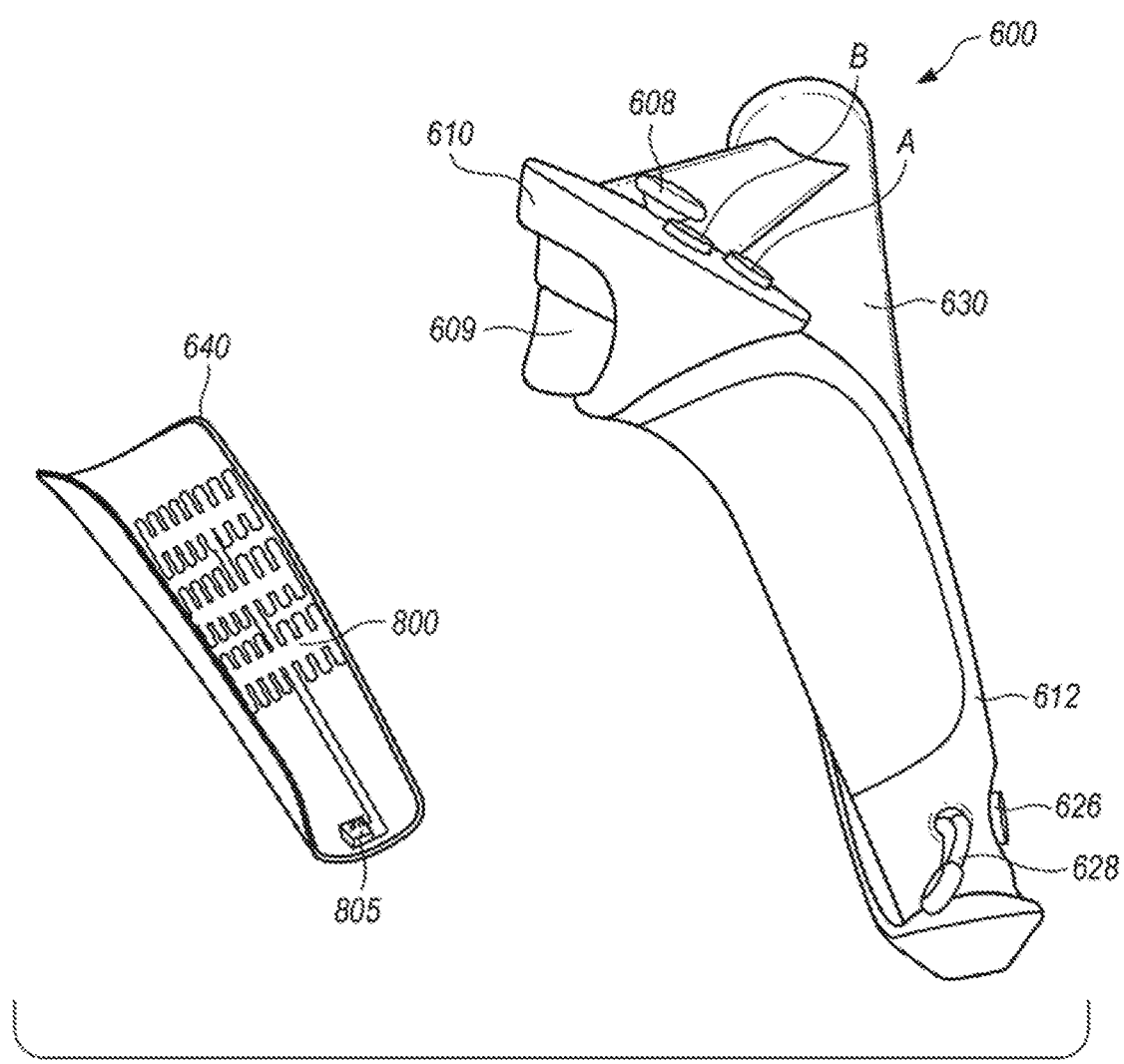
FIG. 8 shows a side view of the right-hand controller of FIG. 6A, with an outer shell that partially wraps the tubular housing of the controller's handle being exploded away to reveal instrumentation on its inner surface.

FIG. 8 shows a side view of the right-hand controller 600, with the outer shell 640, which partially wraps the tubular housing of the handle 612 being exploded away to reveal instrumentation on its inner surface. In the embodiment of FIG. 8, the instrumentation may comprise an array of proximity sensors 800 that are spatially distributed on the inner surface of the outer shell 640, the array of proximity sensors 800 being responsive to a proximity of the user's fingers to the outer shell 640. The proximity sensors 800 of the array are not necessarily of equal size, nor are they necessarily spaced regularly or equally from each other. In certain embodiments, the array of proximity sensors 800 preferably may be a plurality of capacitive sensors that may be connected to a flex circuit that is bonded to the inner surface of the outer shell 640. In the embodiment of FIG. 8, the outer shell 640 includes a first electrical connector portion 805, which may be connected to a mating second electrical connector portion of the handle 612 (as shown in more detail in FIGS. 9A-9B).

Figure 9A:
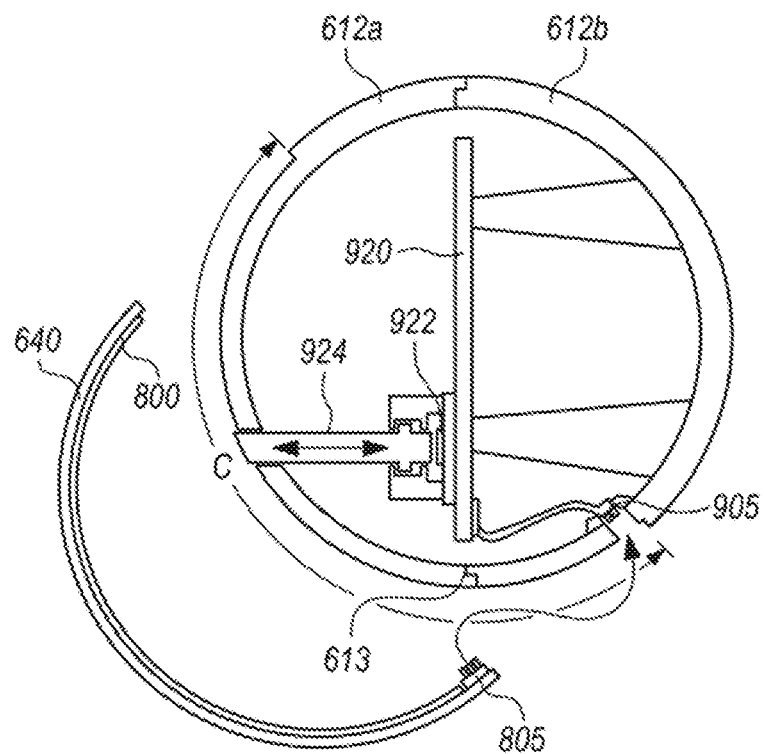
FIG. 9A depicts a cross section of the right-hand controller of FIG. 6A, with an outer shell that partially wraps the tubular housing of the controller's handle being exploded away.
Figure 9B:
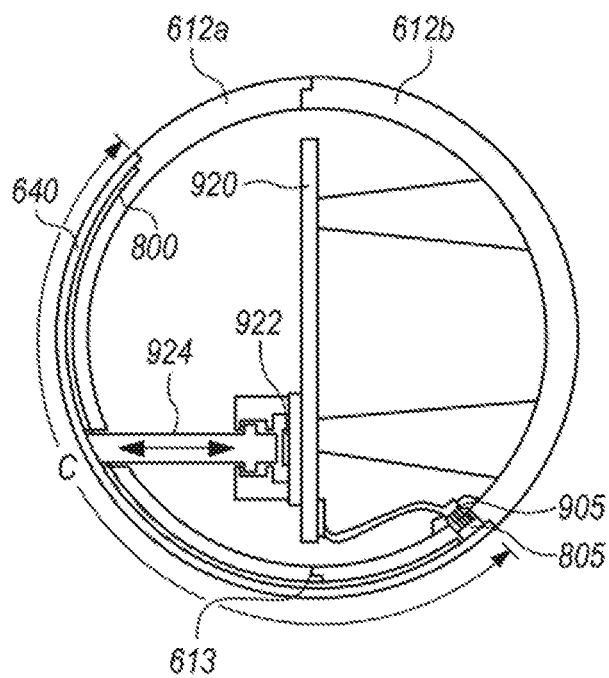
FIG. 9B depicts the cross section of FIG. 9A, except with the outer shell installed in its normal operational position.

FIGS. 9A-B depicts cross sections of the right-hand controller 600 of FIG. 6A, showing that the controller's handle optionally may comprise a tubular housing 612a, 612b, that is split longitudinally by a seam 613 where the tubular housing portions 612a and 612b adjoin. In FIG. 9A, the outer shell 640 is shown exploded away from the rest of the handle. FIG. 9B depicts the cross section of FIG. 9A, except with the outer shell 640 installed in its normal operational position. In the embodiment of FIGS. 9A-9B, the first electrical connector portion 805 of the outer shell 640 is shown to be mating and connectable to the second electrical connector portion 905 of the controller handle.

In the embodiment of FIGS. 9A-9B, the outer shell 640 partially wraps the tubular housing 612a, 612b in such a way that it preferably overlaps the longitudinal seam 613, so that the longitudinal seam 613 may be positioned to optimize the process of manufacture rather than to accommodate the desired circumferential location of the proximity sensor array 800. In certain embodiments, the outer shell 640 overlaps a circumferential portion C of the tubular housing 612a, 612b of the handle, and the circumferential portion C angularly spans at least 100 degrees but not more than 170 degrees of the full circumference of the tubular housing 612a, 612b of the handle. Such a circumferential overlap may, in certain embodiments, enable the proximity sensor array 800 to sense the proximity of a desired portion of the user's fingers or palm, for example the region of the hand that best indicates grasping.

The tubular housing 612a, 612b of the handle need not have a circular cross-section, and that the word "circumference" is used herein whether or not the tubular housing 612a, 612b of the handle has a circular cross-section. Herein, the term "circumference" implies the complete perimeter about the tubular housing 612a, 612b of the handle, which may be circular if the tubular housing 612a, 612b is a right circular hollow cylinder, but which may be a closed shape other than a circle if the tubular housing is shaped as a non-circular cylinder or hollow prism.

In the embodiment of FIGS. 9A-9B, a printed circuit board (PCB) 920 may be mounted within the tubular housing 612a, 612b of the handle, with the second electrical connector portion 905 being electrically coupled to the PCB 920. The PCB 920 optionally includes a force sensing resistor (FSR) 922, and the controller may further comprise a plunger 924 that conveys a compressive force applied via the outer shell 640 towards the outside of the tubular housing 612a, 612b of the handle inward to the FSR 922. In certain embodiments, the FSR 922, in conjunction with the proximity sensor array 800, may facilitate sensing of both the onset of grasping by the user, and the relative strength of such grasping by the user, which may be facilitate certain gameplay features.

In certain embodiments, the outer shell 640 has a shell thickness (measured radially in FIGS. 9A-9B) that is less than one-third of a housing wall thickness of the tubular housing portions 612a or 612b of the handle. In those embodiments, such a thickness inequality may improve the sensitivity of the proximity sensor array 800 relative to an alternative embodiment where the proximity sensor array 800 is disposed on or in the tubular housing 612a, 612b of the handle.

Figure 10A:
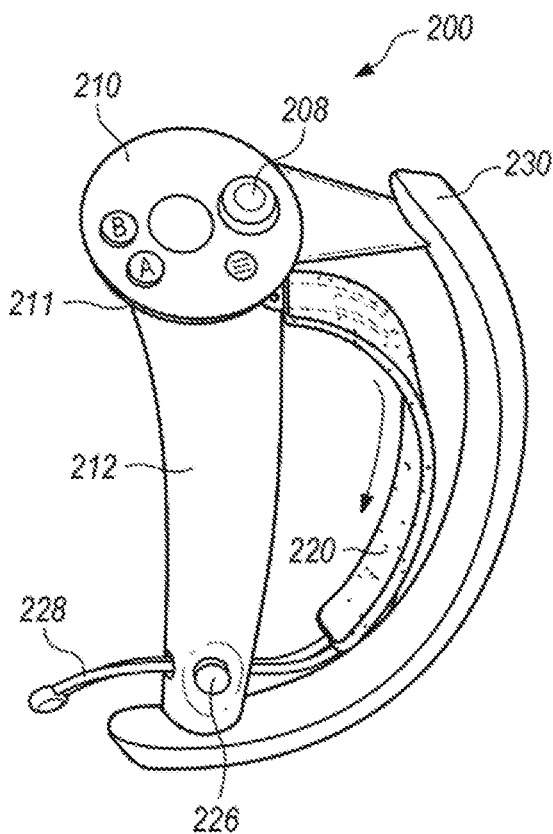
FIG. 10A depicts a front view of right-hand controller according to another example embodiment of the present invention, with a partially-closed hand retainer.
Figure 10B:
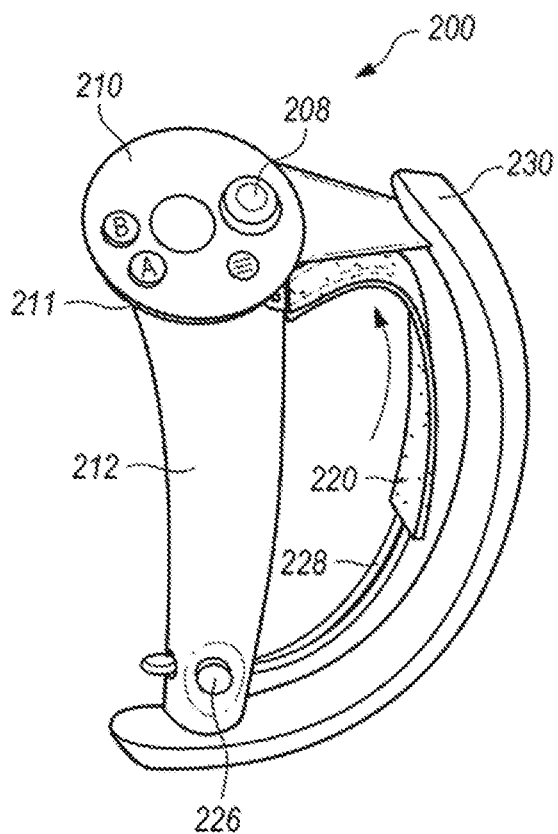
FIG. 10B depicts a front view the controller of FIG. 10A, except with the hand retainer fully open.

FIG. 10A depicts a front view of right-hand controller 200 according to another example embodiment of the present invention, with a partially-closed hand retainer 220 (e.g. a hand retention strap). FIG. 10B depicts a front view the controller 200, except with the hand retainer 220 fully open. In the embodiment of FIGS. 10A-10B, the controller 200 includes a controller body having a head 210 and a handle 212. The head 210 adjoins the handle 212 at a neck region 211 of the controller 200. The handle 212 preferably includes an array of proximity sensors that are spatially distributed just under its outside surface, and that are preferably responsive to a proximity of the user's fingers to the outer surface of the handle 212.

In the embodiment of FIGS. 10A-10B, the head 210 includes thumb-operated controls A, B, and 208. The controller 200 also includes a tracking member 230 that is preferably fixed to the controller body at the head 210 and at a distal end of the handle 212. The tracking member 230 preferably includes a plurality of tracking transducers that may be sensors that are responsive to electromagnetic radiation emitted by the electronic system (e.g. pulsed infrared light emitted by a virtual reality gaming system), or tracking beacons that emit electromagnetic radiation to be received by the electronic system. In the embodiment of FIGS. 10A-10B, the tracking member 230 is preferably but not necessarily a tracking arc having an arcuate shape. The hand retainer 220 is preferably disposed between the handle 212 and the tracking arc 230.

In the embodiment of FIGS. 10A-10B, the controller 200 includes a draw cord 228, and a cord lock 226 adjacent a distal end of the handle 212. The cord lock 226 may selectively prevent sliding motion by the draw cord 228 at the cord lock 226. In the embodiment of FIG. 10A, as the draw cord 228 is pulled progressively further past the cord lock 226, the hand retainer 220 is drawn tighter into a closed position (as shown by the motion arrow depicted in FIG. 10A). The closed position physically biases the user's palm against an outer surface of the handle 212.

In the embodiment of FIGS. 10A-10B, the hand retainer 220 preferably includes a resilient member (e.g. an internal or external elastically deformable strip such as a metal strip) that biases the hand retainer 220 towards the open position shown in FIG. 10B. In the embodiment of FIG. 10B, when the user selectively causes the cord lock 226 to release and permit relative sliding of the draw cord 228, the preloaded bias towards straightening of the elastically deformed resilient member causes the hand retainer 220 to naturally open (as shown by the motion arrow depicted in FIG. 10B). The open position may facilitate inserting or withdrawing the user's hand from the controller 200, especially when the user's vision may be obstructed by the wearing of virtual reality goggles.

Figure 11A:
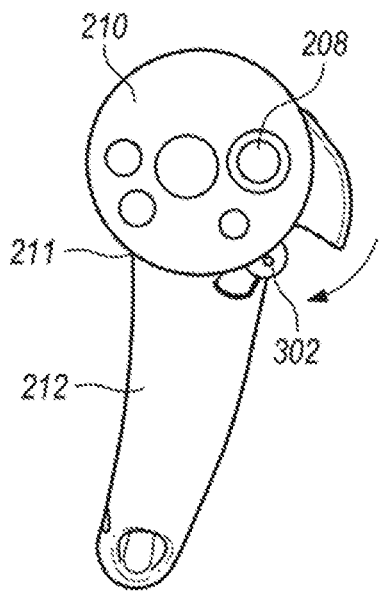
FIG. 11A depicts a front view of head and handle components of a controller according to an example embodiment of the present invention, including a hand retainer anchor that can move peripherally about the head.
Figure 11B:
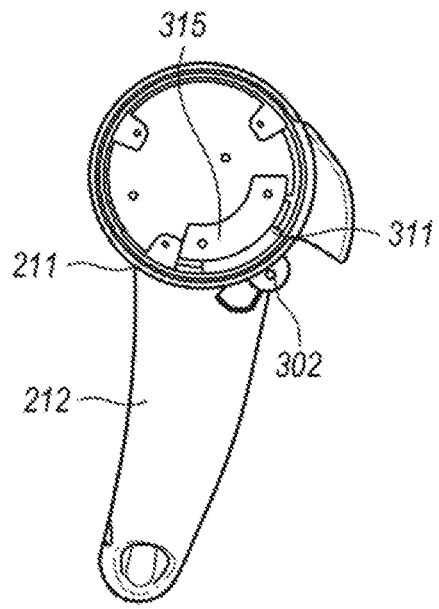
FIG. 11B depicts the head and handle components of FIG. 11A except with a faceplate removed from the head to expose a lockable collar portion that may facilitate selective adjustment of the hand retainer anchor peripherally about the head.

FIG. 11A depicts a front view of the head 210 and handle 212 components of the controller 200, including a hand retainer anchor 302 that can be adjusted to move peripherally about the head 210. FIG. 11B depicts the same head 210 and handle 212 components, except with a faceplate removed from the head 210 to expose a lockable collar portion 311 that may facilitate selective adjustment of the hand retainer anchor 302 peripherally about the head 210.

In the embodiment of FIG. 11B, the lockable collar portion 311 may translate along an arcuate path defined by an internal arcuate guide 315. The lockable collar portion 311 can be selectively locked by the user to prevent further movement of the anchor 302 about the periphery of the head 210. Now referring to FIGS. 4 and 10A-11B, the resilient member of the hand retainer 220 is attached to the hand retainer anchor 302 of the head 210, which permits the hand retainer 220 to be adjusted towards or away from the user's purlicue (between the user's thumb and fingers). In certain embodiments, the resilient member of the hand retainer 220 is preferably attached to the hand retainer anchor 302 of the head 210 by a pivoting or rotatable attachment, so that the hand retainer 220 can pivot relative to the hand retainer anchor 302 at the location of the attachment. Such degree of freedom is additional to the adjustability of the position of the hand retainer anchor 302 about the periphery of the head 210.

Figure 12A:
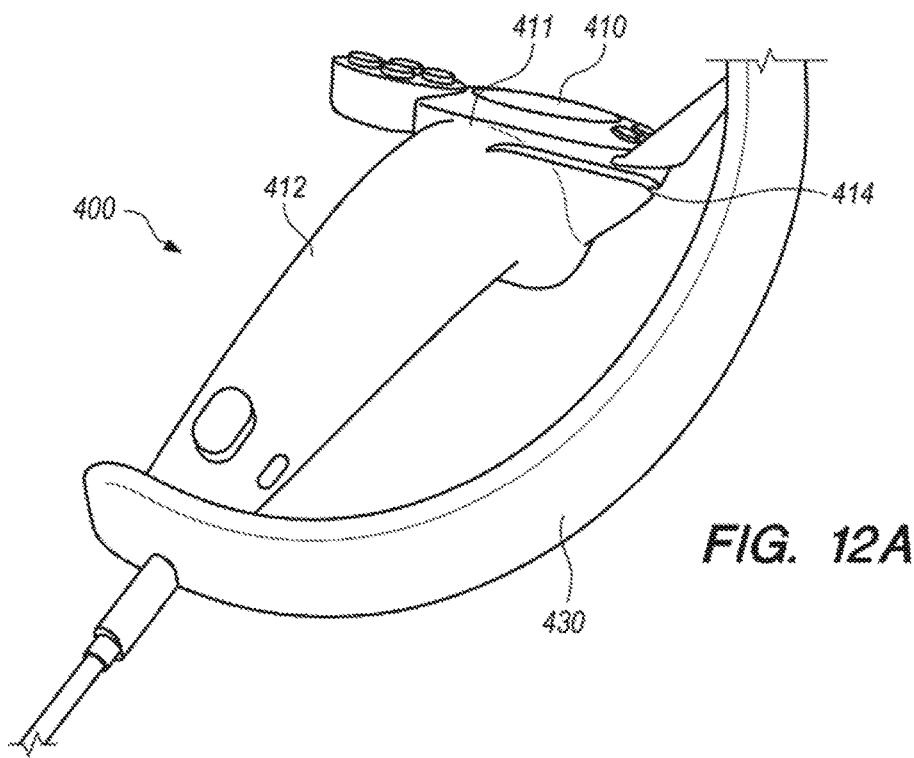
FIG. 12A depicts a partially assembled controller according to an alternative embodiment of the present invention, with a hand retainer component removed.
Figure 12B:
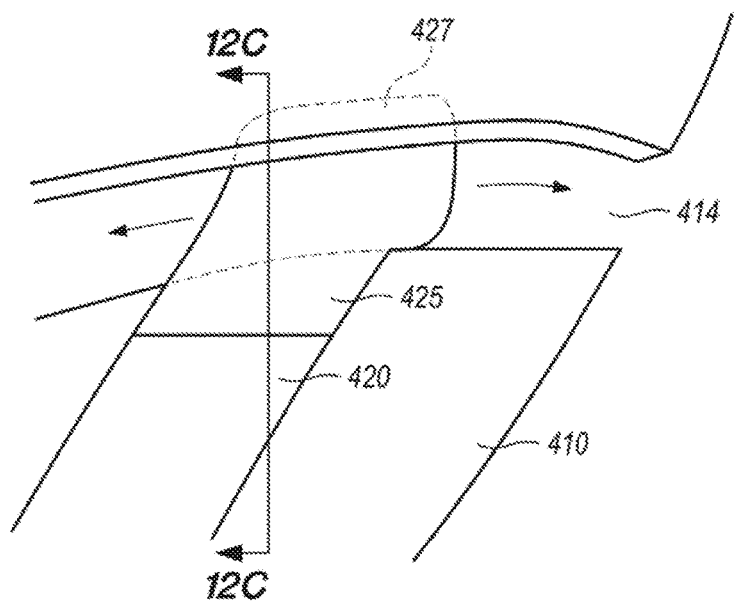
FIG. 12B depicts a closer view of a channel feature of the controller of FIG. 12A.
Figure 12C:
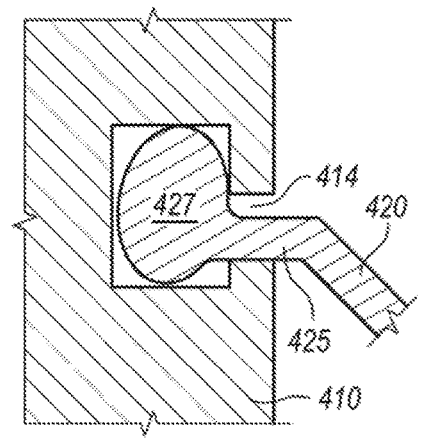
FIG. 12C is a cross-sectional view of the channel depicted in FIG. 12B.

FIGS. 12A, 12B, and 12C depict an alternative embodiment of a partially assembled controller 400 having a controller body that includes a head 410 and a handle 412 joined to the head in a neck region 411. In the alternative embodiment of FIGS. 12A-12C, the controller body includes a channel 414 that is disposed adjacent the neck region 411. A hand retainer, which is not shown in FIG. 12A so that the channel 414 will not be partially obscured, includes a resilient member 420 that terminates in a projection 425 that extends into the channel 414.

In the embodiment of FIGS. 12B and 12C, the projection 425 includes a catch 427 that prevents longitudinal movement of the projection within the channel 414 when the hand retainer is in the closed position. For example, in the embodiment of FIG. 12C, the catch 427 is a cam that increases friction with an interior surface of the channel 414, when a relative angle of the hand retainer projection 425 corresponds to the closed position of the hand retainer—i.e., when the closed position of the hand retainer results in tension upon the resilient member 420 (e.g. in a downward direction as shown in the cross-section of FIG. 12C).

By contrast, when the hand retainer projection 425 is rotated to a relative angle that corresponds to an open position of the hand retainer (e.g. in an upward direction as shown in the cross-section of FIG. 12C), the friction between the catch 427 and the channel 414 is reduced, and the hand retainer projection 425 may be translated within the channel 414 (as indicated by the motion arrows shown in FIG. 12B). The channel 414 is preferably oriented so that translation of the hand retainer projection along the channel 414 preferably adjusts the relative position of the hand retainer projection 425 towards or away from the purlicue of the user's hand, for example so that the controller 400 can accommodate different hand sizes or finger lengths. In an alternative embodiment, the hand retainer projection 425 may be pivotably attached to the remainder of the hand retainer by a conventional pivot joint. Such rotational degree of freedom is additional to the adjustable translation of the hand retainer projection 425 along the channel 414.

The invention is described with reference to specific exemplary embodiments herein, but those skilled in the art will recognize that the invention is not limited to those. It is contemplated that various features and aspects of the invention may be used individually or jointly and possibly in a different environment or application. For example, features shown with regards to a right-hand controller may be implemented also in a left-hand controller, and vice versa. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A controller for an electronic system, for operation by a user having a hand with a palm, the controller comprising:
   a controller body having a head and a handle, the head adjoining the handle at a neck region, the head including at least one thumb-operated control;
   a tracking member that is fixed to the controller body; and
   a hand retainer that in a closed position is configured to physically bias the palm against an outer surface of the handle, the hand retainer including a resilient member that is adjustably attached to the head by an adjustment mechanism that permits an end of the resilient member to be adjusted about a periphery of the head along an arcuate path.

2. The controller of claim 1, wherein the resilient member biases the hand retainer towards an open position.

3. The controller of claim 1, wherein the resilient member is at least partially internal to the hand retainer.

4. The controller of claim 1, further comprising a plurality of tracking transducers disposed in the tracking member, the plurality of tracking transducers being coupled with the electronic system via electromagnetic radiation.

5. The controller of claim 1, further comprising one or more tracking transducers disposed in the head.

6. The controller of claim 1, wherein the hand further includes fingers, the controller further comprising an array of proximity sensors that are spatially distributed on the handle, the array of proximity sensors being responsive to a proximity of the fingers to the outer surface of the handle.

7. The controller of claim 6, wherein the array of proximity sensors comprises a grid of proximity sensors that are embedded under the outer surface of the handle and are spatially distributed in a plurality of rows of proximity sensors.

8. A controller for an electronic system, for operation by a user having a hand with fingers and a palm, the controller comprising:
   a controller body having a head and a handle, the head coupled to the handle at a neck region, the head including at least one thumb-operated control;
   a hand retainer that in a closed position is configured to physically bias the palm against an outer surface of the handle, the hand retainer including a resilient member;
   an adjustment mechanism that couples the resilient member to the head and permits an end of the resilient member to be adjusted about a periphery of the head along an arcuate path; and
   an array of proximity sensors that are spatially distributed on the handle, the array of proximity sensors being responsive to a proximity of the fingers to the outer surface of the handle.

9. The controller of claim 8, wherein the resilient member is curved and biases the hand retainer towards an open position.

10. The controller of claim 8, wherein the hand retainer further includes a hand-retention strap that is adjustable in length by a second adjustment mechanism to transition the hand retainer from an open position to the closed position.

11. The controller of claim 10, wherein the hand-retention strap includes a draw cord, wherein the second adjustment mechanism includes a cord lock disposed adjacent a distal end of the handle, the cord lock selectively preventing sliding motion by the draw cord at the cord lock.

12. The controller of claim 8, wherein the adjustment mechanism comprises a channel in the controller body that is disposed adjacent the neck region, the resilient member including a projection that extends into and can be moved within the channel.

13. The controller of claim 12, wherein the channel is oriented so that movement of the projection within the channel adjusts the projection about the periphery of the head along the arcuate path.

14. The controller of claim 12, wherein the projection is pivotably attached to the resilient member by a pivot joint.

15. A controller for an electronic system, for operation by a user having a hand with a palm, the controller comprising:

a controller body having a head and a handle, the head coupled to the handle at a neck region, the head including at least one thumb-operated control;

one or more tracking transducers disposed in the head;

a hand retainer that in a closed position is configured to physically bias the palm against an outer surface of the handle, the hand retainer including a resilient member; and an adjustment mechanism that couples the resilient member of the hand retainer to the head and permits an end of the resilient member to be adjusted about a periphery of the head along an arcuate path.

16. The controller of claim 15, wherein the adjustment mechanism comprises an anchor that is movable about the periphery of the head along the arcuate path.

17. The controller of claim 16, wherein the anchor is pivotably attached to the resilient member.

18. The controller of claim 16, further comprising a lockable collar portion that is selectively lockable to prevent further movement of the anchor along the arcuate path.

19. The controller of claim 15, further comprising a tracking member, a first end of the tracking member coupled to the head, and a second end of the tracking member coupled to the handle at a distal end of the handle.

20. The controller of claim 15, wherein the adjustment mechanism comprises a channel in the controller body that is disposed adjacent the neck region, the resilient member including a projection that:

extends into and is movable within the channel; and includes a cam that increases friction with an interior surface of the channel when the hand retainer is in the closed position.

* * * * *